United States Patent
Gardner et al.

(10) Patent No.: US 6,583,729 B1
(45) Date of Patent: Jun. 24, 2003

(54) HIGH DATA RATE ACOUSTIC TELEMETRY SYSTEM USING MULTIPULSE BLOCK SIGNALING WITH A MINIMUM DISTANCE RECEIVER

(75) Inventors: Wallace R. Gardner, Houston, TX (US); Vimal V. Shah, Houston, TX (US); Donald Kyle, Plano, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/507,610

(22) Filed: Feb. 21, 2000

(51) Int. Cl.$^7$ ................................................. G01V 3/00

(52) U.S. Cl. ............................... 340/855.4; 340/854.4; 367/82

(58) Field of Search .......................... 340/855.4, 855.5, 340/854.8, 854.4; 375/219, 295, 326, 354, 316; 367/82

(56) References Cited

U.S. PATENT DOCUMENTS

| | | | |
|---|---|---|---|
| 2,810,546 A | 10/1957 | Eaton et al. | 255/1 |
| 3,588,804 A | 6/1971 | Fort | 340/18 |
| 3,790,930 A | 2/1974 | Lamel et al. | 340/18 |
| 4,254,481 A | 3/1981 | Smither et al. | 367/82 |
| 4,282,588 A | 8/1981 | Chanson et al. | 367/82 |
| 4,283,779 A | 8/1981 | Lamel | 367/82 |
| 4,293,936 A | 10/1981 | Cox et al. | 367/82 |
| 4,302,826 A | 11/1981 | Kent et al. | 367/82 |
| 4,314,365 A | 2/1982 | Petersen et al. | 367/82 |
| 4,390,975 A * | 6/1983 | Shawhan | 367/82 |
| 5,050,132 A * | 9/1991 | Duckworth | 367/82 |
| 5,924,499 A * | 7/1999 | Birchak et al. | 367/82 |

OTHER PUBLICATIONS

*Passbands for Acoustic Transmission in an Idealized Drill String*, T. G. Barnes et al., The Journal of the Acoustical Society of America, vol. 51, No. 5 (Part 2), May 1972, pp. 1606–1608.

* cited by examiner

Primary Examiner—Timothy Edwards
(74) Attorney, Agent, or Firm—Daniel J. Kruegger

(57) ABSTRACT

A reliable downhole acoustic telemetry system with increased data rate is disclosed. In one embodiment, the telemetry system includes a receiver having an envelope-detection demodulator and a multipulse-block distance detector that compares a baseband envelope signal to stored waveforms and indicates for each symbol interval the multipulse block having the waveform closest to the baseband envelope signal. The receiver may also include a timing recovery module that models the baseband envelope signal for the detected multipulse blocks and determines a distance for early-sampling and late-sampling of the baseband envelope signal. The timing recovery module then provides a sampling clock that minimizes the average difference between the early- and late-sampling distances. The telemetry system may further include a transmitter having an encoder and a modulator. The encoder converts a data signal into a sequence of multipulse blocks having a settling interval between the blocks. The modulator modulates the multipulse block sequence with a carrier frequency to produce an amplitude modulated signal. The telemetry system may have the transmitter and receiver coupled to a tubing string by an acoustic signal generator and an acoustic transducer, respectively. The acoustic signal generator converts the amplitude modulated signal into acoustic waves that propagate along the tubing string to the acoustic transducer, which then converts the acoustic waves into a receive signal. The system and method disclosed may advantageously provide a robust, low-power telemetry system that communicates telemetry along a tubing string at a rate that is at least an order of magnitude greater than existing acoustic telemetry methods.

24 Claims, 5 Drawing Sheets

HIGH DATA RATE ACOUSTIC TELEMETRY SYSTEM USING MULTIPULSE BLOCK SIGNALING WITH A MINIMUM DISTANCE RECEIVER

BACKGROUND OF THE INVENTION

1. Field of the Invention

The present invention relates to a telemetry system for transmitting data from a downhole drilling assembly to the surface of a well. More particularly, the present invention relates to a system and method for improved acoustic signaling through a drill string.

2. Description of the Related Art

Modem petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

When oil wells or other boreholes are being drilled, it is frequently necessary or desirable to determine the direction and inclination of the drill bit and downhole motor so that the assembly can be steered in the correct direction. Additionally, information may be required concerning the nature of the strata being drilled, such as the formation's resistivity, porosity, density and its measure of gamma radiation. It is also frequently desirable to know other downhole parameters, such as the temperature and the pressure at the base of the borehole, for example. Once this data is gathered at the bottom of the borehole, it is necessary to communicate it to the surface for use and analysis by the driller.

Sensors or transducers typically are located at the lower end of the drill string in LWD systems. While drilling is in progress these sensors continuously or intermittently monitor predetermined drilling parameters and formation data and transmit the information to a surface detector by some form of telemetry. Typically, the downhole sensors employed in MWD applications are positioned in a cylindrical drill collar that is positioned close to the drill bit. The MWD system then employs a system of telemetry in which the data acquired by the sensors is transmitted to a receiver located on the surface. There are a number of telemetry systems in the prior art which seek to transmit information regarding downhole parameters up to the surface without requiring the use of a wireline tool. Of these, the mud pulse system is one of the most widely used telemetry systems for MWD applications.

The mud pulse system of telemetry creates "acoustic" pressure signals in the drilling fluid that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In a mud pressure pulse system, the drilling mud pressure in the drill string is modulated by means of a valve and control mechanism, generally termed a pulser or mud pulser. The pulser is usually mounted in a specially adapted drill collar positioned above the drill bit. The generated pressure pulse travels up the mud column inside the drill string at the velocity of sound in the mud. Depending on the type of drilling fluid used, the velocity may vary between approximately 3000 and 5000 feet per second. The rate of transmission of data, however, is relatively slow due to pulse spreading, distortion, attenuation, modulation rate limitations, and other disruptive forces, such as the ambient noise in the drill string. A typical pulse rate is on the order of a pulse per second (1 Hz).

Given the recent developments in sensing and steering technologies available to the driller, the amount of data that can be conveyed to the surface in a timely manner at 1 bit per second is sorely inadequate. As one method for increasing the rate of transmission of data, it has been proposed to transmit the data using vibrations in the tubing wall of the drill string rather than depending on pressure pulses in the drilling fluid. However, early systems have proven to be unreliable at data rates greater than about 3 bits/s due to acoustic reflections at tool joints and variations in the geometry of the tubing and borehole.

SUMMARY OF THE INVENTION

Accordingly, there is disclosed herein a reliable downhole acoustic telemetry system with increased data rate. In one embodiment, the telemetry system includes a receiver having an envelope-detection demodulator and a multipulse block distance detector. The envelope-detection demodulator converts a bandpass signal into a baseband envelope signal. The distance detector compares the baseband envelope signal to stored waveforms, and indicates for each symbol interval the multipulse block having the waveform closest to the baseband envelope signal. The distance detector may use any distance metric, including absolute value and even powers of the difference between the baseband envelope signal and the stored waveforms. The receiver may also include a timing recovery module that models the baseband envelope signal for the detected multipulse blocks and determines a distance for early-sampling and late-sampling of the baseband envelope signal. The timing recovery module then provides a sampling clock that minimizes the average difference between the early- and late-sampling distances.

The telemetry system may further include a transmitter having an encoder and a modulator. The encoder converts a data signal into a sequence of multipulse blocks having a settling interval between the blocks. The modulator modulates the multipulse block sequence with a carrier frequency to produce an amplitude modulated signal.

The telemetry system may have the transmitter and receiver coupled to a tubing string by an acoustic signal generator and an acoustic transducer, respectively. The acoustic signal generator converts the amplitude modulated signal into acoustic waves that propagate along the tubing string to the acoustic transducer, which then converts the acoustic waves into a receive signal.

Also contemplated is a method for communicating telemetry data via a tubing string. The method comprises: (a) encoding a telemetry data signal into a sequence of multipulse blocks having a fixed settling interval between blocks; (b) modulating the multipulse block sequence with a carrier frequency to produce an amplitude modulated signal; (c) converting the amplitude modulated signal into acoustic waves that propagate along the tubing string; (d) converting acoustic waves received via the tubing string into a receive signal; (e) filtering the receive signal to remove out-of-band noise; (f) rectifying the receive signal to produce a baseband envelope signal; and (g) comparing the baseband envelope signal to stored multipulse block waveforms to produce a detection signal indicative of a multipulse block closest to the baseband envelope signal for each symbol interval.

The method and apparatus disclosed may advantageously provide a robust, low-power telemetry system that communicates telemetry along a tubing string at a rate that is at least double that of existing acoustic telemetry methods.

BRIEF DESCRIPTION OF THE DRAWINGS

A better understanding of the present invention can be obtained when the following detailed description of the preferred embodiment is considered in conjunction with the following drawings, in which.

Figure 1:
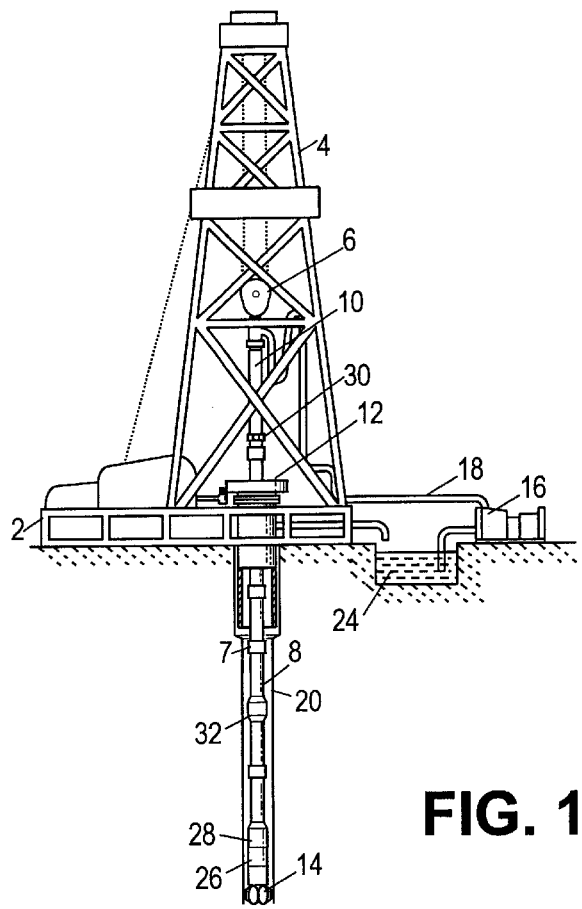
FIG. 1 is a schematic view of an oil well in which an acoustic telemetry system may be employed.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods. Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

In a preferred embodiment, downhole sensors 26 are coupled to an acoustic telemetry transmitter 28 that transmits telemetry signals in the form of acoustic vibrations in the tubing wall of drill string 8. An acoustic telemetry receiver 30 is coupled to the kelly 10 to receive transmitted telemetry signals. One or more repeater modules 32 may be provided along the drill string to receive and retransmit the telemetry signals. The repeater modules 32 include both an acoustic telemetry receiver and an acoustic telemetry transmitter configured similarly to receiver 30 and the transmitter 28.

Figure 2:
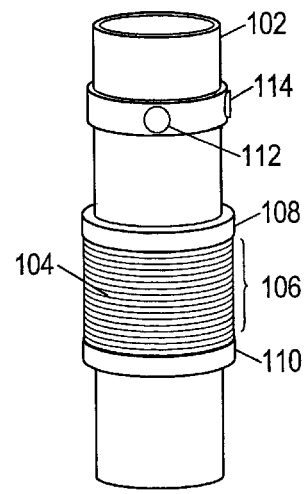
FIG. 2 is a view of an acoustic transmitter and an acoustic receiver.

For the purposes of illustration, FIG. 2 shows a repeater module 32 that includes an acoustic transmitter 104 and an acoustic sensor 112 mounted on a piece of tubing 102. One skilled in the art will understand that acoustic sensor 112 is configured to receive signals from a distant acoustic transmitter, and that acoustic transmitter 104 is configured to transmit to a distant acoustic sensor. Consequently, although the transmitter 104 and sensor 112 are shown in close proximity, they would only be so proximate in a repeater module 32 or in a bi-directional communications system. Thus, for example, transmitter 28 might only include the transmitter 104, while receiver 30 might only include sensor 112, if so desired.

The following discussion centers on acoustic signaling from a transmitter 28 near the drill bit 14 to a sensor located some distance away along the drill string. Various acoustic transmitters are known in the art, as evidenced by U.S. Pat. Nos. 2,810,546, 3,588,804, 3,790,930, 3,813,656, 4,282,588, 4,283,779, 4,302,826, and 4,314,365, which are hereby incorporated by reference. The transmitter 104 shown in FIG. 2 has a stack of piezoelectric washers 106 sandwiched between two metal flanges 108, 110. When the stack of piezoelectric washers 106 is driven electrically, the stack 106 expands and contracts to produce axial compression waves in tubing 102 that propagate axially along the drill string. Other transmitter configurations may be used to produce torsional waves, radial compression waves, or even transverse waves that propagate along the drill string.

Various acoustic sensors are known in the art including pressure, velocity, and acceleration sensors. Sensor 112 preferably comprises a two-axis accelerometer that senses accelerations along the axial and circumferential directions. One skilled in the art will readily recognize that other sensor configurations are also possible. For example, sensor 112 may comprise a three-axis accelerometer that also detects acceleration in the radial direction. A second sensor 114 may be provided 90 or 180 degrees away from the first sensor 112. This second sensor 114 also preferably comprises a two or three axis accelerometer. Additional sensors may also be employed as needed.

A reason for employing multiple sensors stems from an improved ability to isolate and detect a single acoustic wave propagation mode to the exclusion of other propagation modes. Thus, for example, a multi-sensor configuration may exhibit improved detection of axial compression waves to the exclusion of torsional waves, and conversely, may exhibit improved detection of torsional waves to the exclusion of axial compression waves. Copending application Ser. No. 09/332,641 filed Jun. 14, 1999 and entitled "Acoustic Telemetry System With Drilling Noise Cancellation" by inventors W. R. Gardner, V. V. Shah, and J. W. Minear discusses one desirable sensor configuration, and is hereby incorporated herein by reference.

Figure 3:
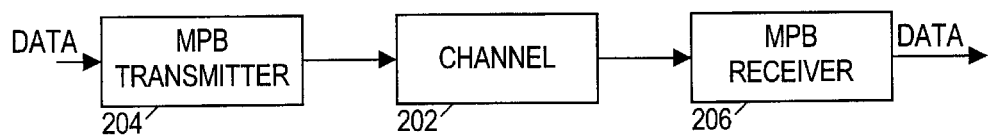
FIG. 3 is a functional block diagram of the multipulse block telemetry system.
Figure 4:
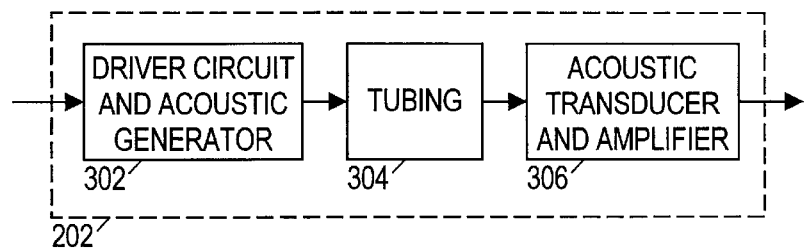
FIG. 4 is a functional block diagram of the through-tubing acoustic communications channel.

As shown in FIG. 3, the through-tubing acoustic telemetry system may be modeled using three functional blocks: a channel 202, a multipulse block transmitter 204, and a multipulse block receiver 206. As FIG. 4 shows, the channel 202 by which the multipulse block transmitter and multipulse block receiver communicate comprises a driver circuit and acoustic generator 302, the tubing string 304, and an acoustic transducer and amplifier 306. The driver and generator 302 convert telemetry-carrying electronic signals into acoustic waves that travel along the tubing string in both directions from the transmitter. The acoustic generator is preferably a piezoelectric transducer, although one of skill in the art will recognize that other acoustic transmitters may be used. The acoustic transducer and amplifier 306 convert the received acoustic signals into electronic form. Blocks 302, 306 can be designed to minimize signal distortion to insignificant levels. However, the tubing string 304 inevitably introduces a significant amount of distortion.

As with all signal transmission media, sudden changes in impedance cause reflections to occur. In the tubing string 304, the primary causes of acoustic impedance changes are tool joints and the ends of the tubing string. The hundreds of regularly-spaced tool joints cause many small echoes and re-echoes of the transmitted signal. At the receiving end, these appear as a large, slowly-decaying "ringing" that resonates during and after the arrival of the signal. Additionally, when the transmitter is located near one end of the tubing, a strong echo bounces off the end of the tubing, causing more ringing and potentially interfering with the transmitted signal in an undesirable manner.

Existing through-tubing acoustic communications systems have dealt with these problems by providing a "ring-down" time between transmitted signal pulses to allow the ringing to fall to tolerable levels. Signal pulses are modulated by one of two frequencies to represent binary values of 0 and 1. In an illustrative system, the width of a signal pulse might be 0.01 seconds, while the ring-down time after each pulse might last about 0.09 seconds. While this minimizes the inter-symbol interference problems, the resulting transmission rate is only about 10 bits per second. This approach is known as the modified frequency-shift keying (FSK) method.

Figure 5:
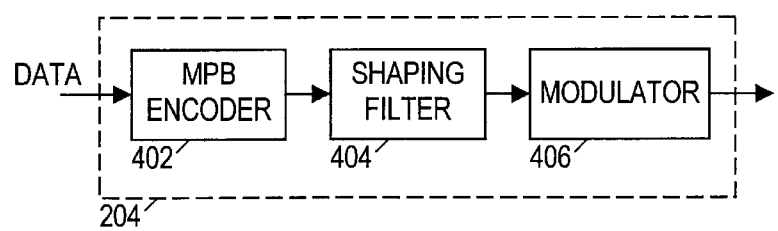
FIG. 5 is a functional block diagram of a multipulse block transmitter.

FIG. 5 shows an multipulse block transmitter 204 that increases the information transmission rate by sending pulses in bursts, or "multipulse blocks (MPB)", without providing a ring-down period between pulses in the burst. To avoid an excessive build-up of intersymbol interference, a pause is provided between blocks to allow for partial or complete ring-down to occur before the next block is sent. At the receiving end, each block preferably demodulated as a unit rather than pulse by pulse. Also, to reduce demodulation complexity at the receiving end, the transmitter preferably uses on-off keying (OOK) or amplitude modulation (AM) in place of frequency-shift keying (FSK).

Figure 9A:
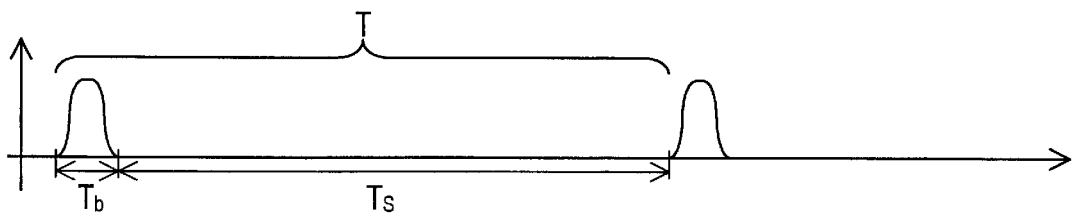
FIGS. 9A–9E are graphs of various signaling techniques.

Referring momentarily to FIGS. 9A–9E, the preferred MPB modulation method is described. FIG. 9A shows a symbol period T that consists of a single bit pulse interval $T_b$ followed by a settling period $T_S$. The modified FSK technique modulates the pulses with different frequencies to represent bit values of 0 and 1. The single bit interval is chosen to be long enough to provide enough signal energy for reliable detection at the surface given the power constraints of the transmitter. The settling period is chosen to be long enough for the residual ringing at the surface to be insignificant when the next pulse arrives.

Figure 9B:
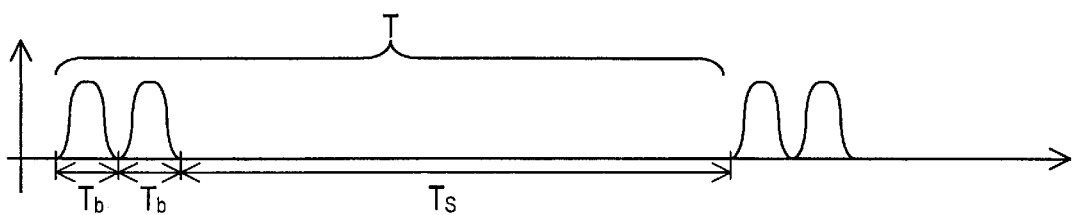

FIG. 9B shows a symbol period T that consists of two adjacent single bit pulse intervals $T_b$ followed by a settling period $T_S$. Rather than modulating with different frequencies, it is preferred to use OOK. That is, a pulse is transmitted to represent one binary value (e.g. "1"), and suppressed to represent the other (e.g. "0"). For the signaling format shown in FIG. 9B, four multipulse blocks are possible. The "11" block is shown in FIG. 9B. In the "01" and the "10" blocks, the first or second pulses are suppressed, respectively. In the "00" block, both pulses are suppressed. $T_b$ is chosen to provide enough signal energy for reliable detection of a non-zero pulse, and $T_S$ is chosen to be long enough for the residual ringing to be negligible when the next multipulse block arrives.

Figure 9C:
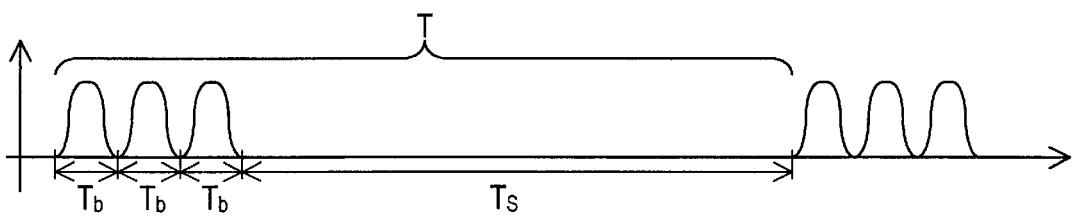
Figure 9D:
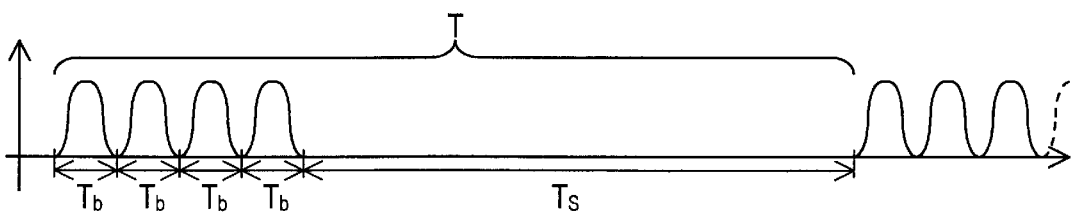

FIG. 9C shows a symbol period T that consists of three adjacent single bit pulse intervals $T_b$ followed by a settling period $T_S$. Again, it is preferred to use OOK, so that the signal format of FIG. 9C provides for eight possible multipulse blocks. FIG. 9D shows a symbol period T that consists of four adjacent single bit pulse intervals, thereby providing sixteen possible multi-pulse blocks. As before, $T_b$ is chosen to provide enough signal energy for reliable detection of a non-zero pulse, and $T_S$ is chosen to be long enough for the residual ringing to be negligible when the next multipulse block arrives. Using the illustrative numbers of 0.01 seconds and 0.09 seconds for $T_b$ and $T_S$ respectively, varying the number of bits in a multipulse block from 2 to 7 provides data rate increases of 182% to 438% respectively.

Figure 9E:
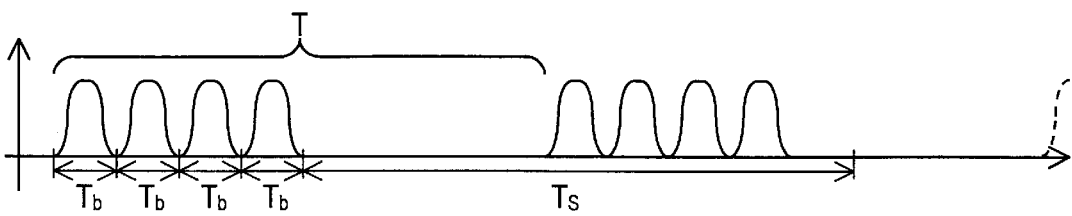

Even greater gains may be realized by reducing the symbol period as shown in FIG. 9E and using equalization to remove the interference from subsequent blocks. A block decision feedback equalizer (Block DFE) with the distance detector (described below) as a decision element and a feedback path modified to account for the nonlinearity introduced by the envelope-detection demodulator (described below) would be suitable. It is preferred that the settling period $T_S$ not extend more than one symbol period T past the end of the current symbol period.

Returning to FIG. 5, the multipulse block transmitter 204 includes a multipulse encoder 402, a shaping filter 404, and a modulator 406. The multipulse encoder 402 accepts binary telemetry data and encodes it into a series of multipulse blocks. This encoding preferably introduces some error correction redundancy and prevents any extended period of all-zero blocks from being transmitted across the channel. Depending on implementation, the multipulse blocks are preferably provided from the encoder 402 as an analog signal or oversampled digital sequence that, when passed through pulse shaping filter 404, yields a raised-cosine pulse sequence with raise-cosine pulses representing ones and the absence of such pulses representing zeros. In any event shaping filter 404 preferably provides "soft" transitions rather than sharp transitions in the multipulse blocks to reduce high frequency content. Shaping filter 404 may for example be a low-pass, raised-cosine filter. Modulator 406 multiplies the filtered multipulse block sequence with a carrier frequency signal, thereby producing an amplitude-modulated signal for transmission through channel 202.

Figure 6:
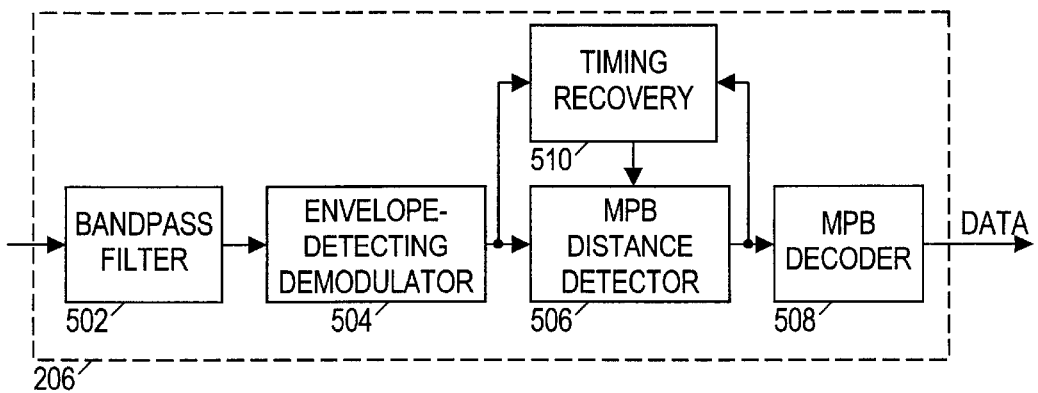
FIG. 6 is functional block diagram of a multipulse block receiver.

On the receiving end is a multipulse block receiver such as that shown in FIG. 6. A bandpass filter 502 removes noise outside the signal band from the received signal. The bandpass filtered signal is demodulated by an envelope detector 504. In one implementation, the envelope detector 504 rectifies the bandpass filtered signal, and then lowpass filters the rectified signal to produce a (rectified) baseband signal. This implementation advantageously achieves demodulation with very low power and complexity. A minimum distance detector 506 is preferably used to identify the multipulse blocks which are then decoded by a decoder 508. Decoder 508 reverses the encoding process of encoder 402 to correct errors and remove the redundancy from the transmitted data. A timing recovery circuit 510 compares the input and output signals from detector 506 to provide a timing signal to detector 506.

Figure 7:
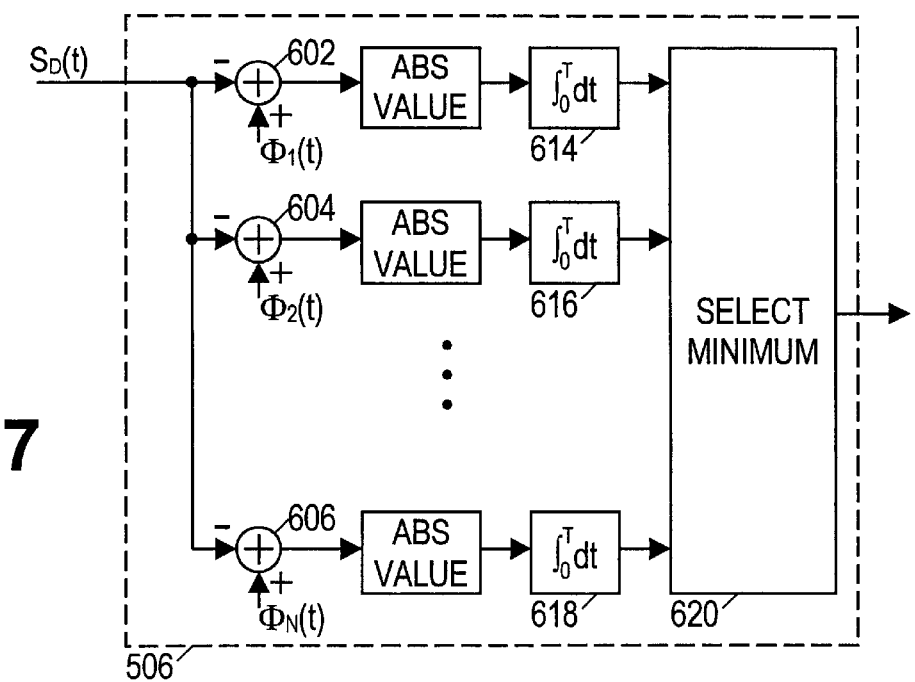
FIG. 7 is a functional block diagram of a distance detector embodiment.

One embodiment of minimum distance detector 506 is shown in FIG. 7. Demodulated signal $S_D(t)$ is provided to a series of adders 602–606 which each subtract the demodulated signal from respective model waveforms $\Phi_1(t)$ through $\Phi_N(t)$. The model waveforms represent the ideal waveforms for each valid multipulse block. The absolute values of the difference signals from adders 602–606 are provided to integrators 614–618. The integrators integrate the absolute value of the difference signals over the time interval of each symbol period T to determine a distance value between the demodulated signal and each model waveform. A multi-input comparator 620 receives each of the distance values, determines which distance value is smallest, and outputs the multipulse block having the waveform closest to the demodulated signal. The detector provides a stream of detected multipulse blocks hereafter denoted $S_M(t)$.

It is noted that rather than using the absolute values, an even power (square, quadratic, etc.) of the difference signal may also be, used. Nevertheless, it is believed that the absolute value will prove to be easier to generate than an even power function.

Figure 8:
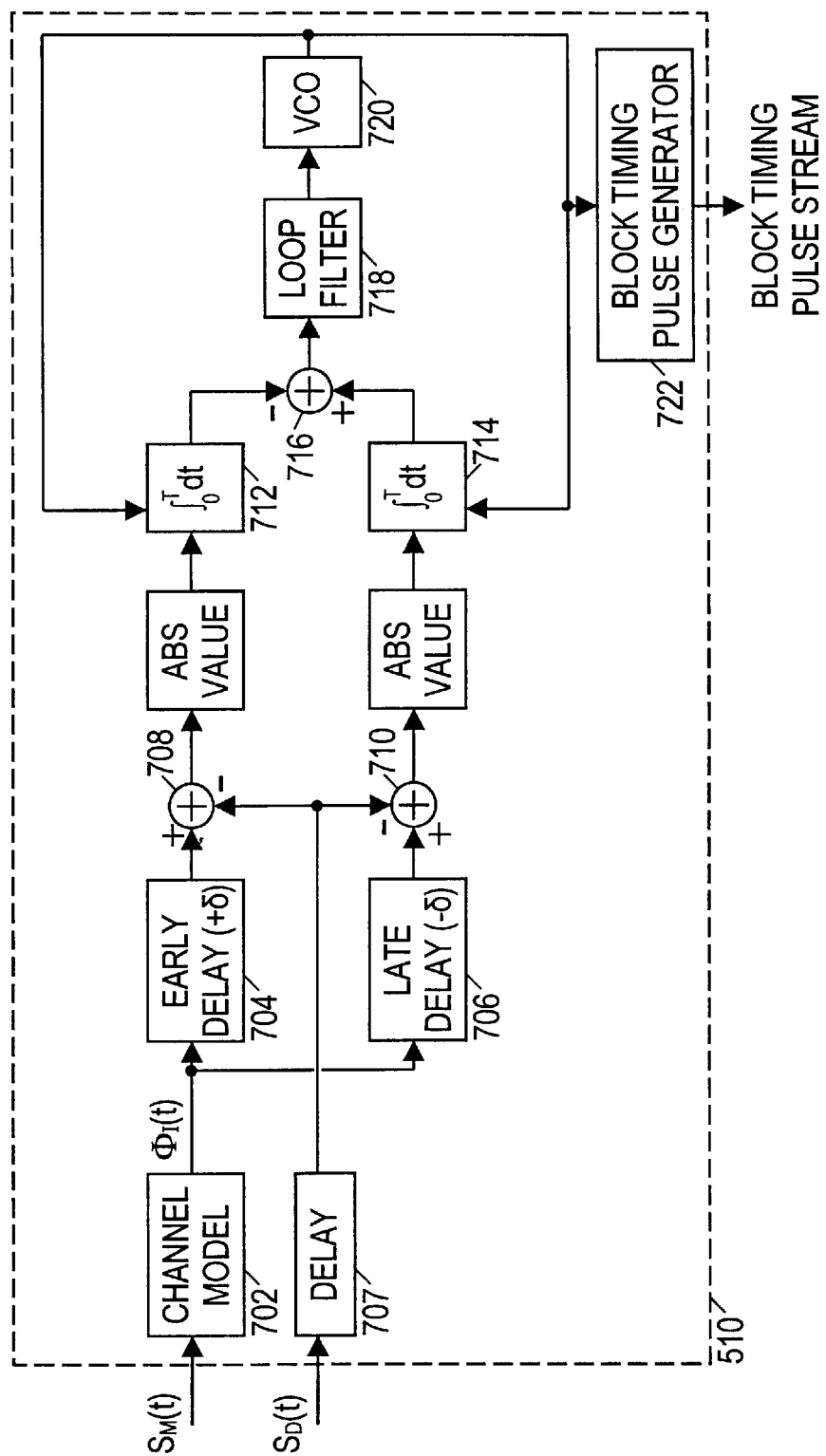
FIG. 8 is a functional block diagram of a timing recovery circuit.

One embodiment of the timing recovery circuit 510 is shown in FIG. 8. The stream of detected multipulse blocks $S_M(t)$ is passed through channel model 702 to produce an ideal rectified demodulated signal $\Phi_1(t)$. This signal is provided to an early delay element 704 and a late delay element 706. These elements offset the ideal signal relative to the received signal, which is delayed by delay element 707. To determine if the received signal was sampled early, the ideal signal is delayed by $+\delta$ relative to the received signal, and an adder 708 determines a difference signal. Similarly, to determine if the received signal was sampled late, the ideal signal is advanced by $\delta$ relative to the received signal, and an adder 710 determines a difference signal. The absolute values of the difference signals are integrated over one symbol period T by integrators 712 and 714 to determine a distance value for both cases. The distances are subtracted by adder 716 to determine a phase error value. The phase error value is filtered by a loop filter 718 to determine a frequency signal for VCO (voltage controlled oscillator) 720. The loop filter is designed to minimize the average energy of the phase error value. The voltage controlled oscillator 720 generates a timing clock signal whose frequency is determined by the value of the frequency signal. The timing clock is provided to the integrators 712, 714, where it is delayed or advanced by $\delta$ to assure the proper integration interval. The timing clock is also provided to a block timing pulse generator 722 which generates a stream of block timing pulses for operation of the multipulse block distance detector.

Many suitable equalizers that may be used in MPB receiver 206 to detect the multipulse blocks are known and contemplated, such as a linear equalizer, a fractionally-spaced equalizer, a decision feedback equalizer, and a maximum likelihood sequence estimator. These are described in detail in Chapter 6 (pp. 519–692) of John G. Proakis, *Second Edition Digital Communications,* McGraw-Hill Book Company, New York, (c)1989, which is hereby incorporated herein by reference. Each of the equalizers may be implemented in adaptive form to enhance their performance over a range of variable channel conditions. Filter adaptation is well known and is described in various standard texts such as Simon Haykin, *Adaptive Filter Theory,* Prentice-Hall, Englewood Cliffs, (c)1986. Nevertheless, low-cost, low-power, robust performance is expected with the use of the disclosed envelope-detection demodulator architecture.

It is noted that the disclosed system offers reliable data transmission rates at least double the rate of existing acoustic telemetry systems. This is achieved through multipulse block signaling and a novel receiver design. It is further noted that acoustic signaling may be performed in both directions, uphole and downhole. Repeaters may also be included along the drill string to extend the signaling range. It is also further noted that the disclosed acoustic telemetry system may operate through continuous (coiled) tubing as well as threaded tubing, and can be employed for both MWD and LWD systems, as well as for production logging using permanently installed sensors, smart-wells, and drill stem testing.

Numerous variations and modifications will become apparent to those skilled in the art once the above disclosure is fully appreciated. It is intended that the following claims be interpreted to embrace all such variations and modifications.

What is claimed is:

1. A telemetry receiver that comprises:
   an envelope-detecting demodulator configured to receive a bandpass signal and configured to convert the bandpass signal into a baseband envelope signal; and a multipulse block distance detector coupled to the envelope-detecting demodulator to receive the baseband envelope signal and configured to compare the baseband envelope signal to a plurality of stored multipulse block waveforms, wherein the detector is further configured to provide a detection signal indicative of a multipulse block closest to the baseband envelope signal for each symbol interval.

2. The receiver of claim 1, further comprising:
a decoder configured to convert the detection signal into a data signal indicative of transmitted telemetry data.

3. The receiver of claim 1, wherein the multipulse block distance detector includes:
an adder configured to provide a difference signal indicative of a difference between the baseband envelope signal and a stored multipulse block waveform;
a distance module configured to convert the difference signal into a distance metric signal;
an integrator configured to integrate the distance metric signal over one symbol interval to determine a distance value; and
a comparator configured to compare the distance value to other distance values to determine a multipulse block having a waveform with a minimum distance from the baseband envelope signal.

4. The receiver of claim 3, wherein the distance module determines the absolute value of the difference signal.

5. The receiver of claim 3, the distance module determines an even power of the difference signal.

6. The receiver of claim 1, further comprising a timing recovery module that includes:
a delay element configured to receive the baseband envelope signal and configured to delay the baseband envelope signal by at least one symbol interval;
a channel model element configured to receive the detection signal and configured to produce a model baseband envelope signal;
an adder coupled to receive the delayed baseband envelope signal and the model baseband envelope signal, and configured to determine a time-offset difference signal;
a distance module configured to convert the time-offset difference signal into a time-offset distance metric signal.

7. The receiver of claim 6, wherein the timing recovery module further includes:
an integrator configured to integrate the time-offset distance metric signal over one symbol period at a time.

8. The receiver of claim 6, wherein the timing recovery module further includes:
a comparator coupled to receive the time-offset distance metric signal and configured to receive another distance metric signal, wherein the comparator is further configured to determine a time-offset distance difference signal;
a loop filter coupled to receive the time-offset distance difference signal and configured to determine a frequency control value; and
a voltage-controlled oscillator configured to generate a clock signal having a frequency that corresponds to the frequency control value.

9. A telemetry transmitter that comprises:
a multipulse block encoder configured to receive a data signal and configured to convert the data signal into a multipulse block sequence having a settling interval between blocks; and a modulator coupled to receive the multipulse block sequence and configured to multiply a carrier frequency signal with the multipulse block sequence to produce an amplitude modulated transmit signal.

10. The transmitter of claim 9, wherein the settling interval is greater than or equal to the length of the multipulse blocks.

11. The transmitter of claim 9, wherein each multipulse block has a fixed number of pulses, wherein said fixed number is between 2 and 7, inclusive.

12. The telemetry transmitter of claim 9, further comprising:
a raised-cosine shaping filter coupled between the encoder and the modulator, wherein the shaping filter is configured to alter the shape of pulses in the multipulse block sequence.

13. The transmitter of claim 9, wherein each pulse in the multipulse block interval has at least two possible amplitudes.

14. The transmitter of claim 13, wherein the two possible amplitudes include zero and a maximum pulse amplitude.

15. A telemetry system that comprises:
a transmitter that includes:
a multipulse block encoder configured to receive a data signal and configured to convert the data signal into a multipulse block sequence having a settling interval between blocks; and
a modulator coupled to receive the multipulse block sequence and configured to multiply a carrier frequency signal with the multipulse block sequence to produce an amplitude modulated transmit signal; and
a channel configured to transport the amplitude modulated transmit signal; and
a receiver that includes:
a bandpass filter configured to receive the amplitude modulated signal and configured to remove out-of-band energy to produce a bandpass signal;
an envelope-detecting demodulator configured to convert the bandpass signal into a baseband envelope signal; and
a multipulse block distance detector coupled to the envelope-detecting demodulator to receive the baseband envelope signal and configured to compare the baseband envelope signal to a plurality of stored multipulse block waveforms, wherein the detector is further configured to provide a detection signal indicative of a multipulse block closest to the baseband envelope signal for each symbol interval.

16. The system of claim 15, wherein the channel includes:
a tubing string located in a borehole;
an acoustic signal generator coupled to the tubing string and configured to convert the amplitude modulated signal into acoustic waves that propagate along the tubing string; and
an acoustic transducer coupled to the tubing string and configured to convert the acoustic waves into a receive signal indicative of the amplitude modulated transmit signal.

17. The system of claim 15, wherein the settling interval is greater than or equal to the length of the multipulse blocks.

18. The system of claim 15, wherein the multipulse block distance detector includes:
an adder configured to provide a difference signal indicative of a difference between the baseband envelope signal and a stored multipulse block waveform;
a distance module configured to convert the difference signal into a distance metric signal;

an integrator configured to integrate the distance metric signal over one symbol interval to determine a distance value; and a comparator configured to compare the distance value to other distance values to determine a multipulse block having a waveform with a minimum distance from the baseband envelope signal.

19. The system of claim 18, wherein the distance module determines the absolute value of the difference signal.

20. The receiver of claim 18, the distance module determines an even power of the difference signal.

21. A method for communicating telemetry data via a tubing string, wherein the method comprises:

encoding a telemetry data signal into a sequence of multipulse blocks having a fixed settling interval between blocks;

modulating the multipulse block sequence with a carrier frequency to produce an amplitude modulated signal;

converting the amplitude modulated signal into acoustic waves that propagate along the tubing string;

converting acoustic waves received via the tubing string into a receive signal;

filtering the receive signal to remove out-of-band noise;

rectifying the receive signal to produce a baseband envelope signal;

comparing the baseband envelope signal to a plurality of stored multipulse block waveforms to produce a detection signal indicative of a multipulse block closest to the baseband envelope signal for each symbol interval.

22. The method of claim 21, wherein said comparing includes:

determining difference signals indicative of differences between the baseband envelope signal and each of the plurality of stored multipulse block waveforms;

applying a distance metric operation to the difference signals to obtain distance metric signals;

integrating the distance metric signals over one symbol interval to determine distance values; and comparing the distance values to determine a multipulse block having a minimum distance value.

23. The method of claim 22, wherein the distance metric operation determines the absolute value of the difference signal.

24. The method of claim 22, wherein the distance metric operation determines an even power of the difference signal.

* * * * *